(12) United States Patent
Opheim et al.

(10) Patent No.: US 7,054,695 B2
(45) Date of Patent: May 30, 2006

(54) FIELD MAINTENANCE TOOL WITH ENHANCED SCRIPTS

(75) Inventors: Gregory J. Opheim, St. Paul, MN (US); Thanh Truong, Lakeville, MN (US); Christopher P. Kantzes, Minneapolis, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 40 days.

(21) Appl. No.: 10/438,401

(22) Filed: May 15, 2003

(65) Prior Publication Data

US 2004/0230327 A1    Nov. 18, 2004

(51) Int. Cl.
G06F 15/00    (2006.01)
G06F 17/40    (2006.01)
G05B 11/01    (2006.01)

(52) U.S. Cl. .................. 700/83; 702/183; 702/184; 702/187

(58) Field of Classification Search .................. 700/17, 700/19, 21, 83, 108, 100; 702/123, 182, 702/183, 185, 187
See application file for complete search history.

(56) References Cited

U.S. PATENT DOCUMENTS

| | | | |
|---|---|---|---|
| 3,955,132 A | 5/1976 | Greenwood | 323/15 |
| 4,337,516 A | 6/1982 | Murphy et al. | 364/551 |
| 4,630,265 A | 12/1986 | Sexton | 370/86 |
| 4,635,214 A | 1/1987 | Kasai et al. | 364/551 |
| 4,707,796 A | 11/1987 | Calabro et al. | 364/552 |
| 4,954,923 A | 9/1990 | Hoeflich et al. | 361/111 |
| 4,964,125 A | 10/1990 | Kim | 371/15.1 |
| 4,988,990 A | 1/1991 | Warrior | 340/25.5 |
| 5,005,142 A | 4/1991 | Lipchak et al. | 364/550 |
| 5,103,409 A | 4/1992 | Shimizu et al. | 364/556 |
| 5,113,303 A | 5/1992 | Herres | 361/45 |
| 5,148,378 A | 9/1992 | Shibayama et al. | 364/571.07 |
| 5,150,289 A | 9/1992 | Badavas | 364/154 |
| 5,197,328 A | 3/1993 | Fitzgerald | 73/168 |
| 5,426,774 A * | 6/1995 | Banerjee et al. | 714/16 |
| 5,434,774 A | 7/1995 | Seberger | 364/172 |
| 5,442,639 A | 8/1995 | Crowder et al. | 371/20.1 |
| 5,469,156 A | 11/1995 | Kogure | 340/870.38 |
| 5,481,200 A | 1/1996 | Voegele et al. | 324/718 |
| 5,570,300 A | 10/1996 | Henry et al. | 364/551.01 |
| 5,573,032 A | 11/1996 | Lenz et al. | 137/486 |
| 5,598,521 A | 1/1997 | Kilgore et al. | 395/326 |
| 5,623,605 A | 4/1997 | Keshav et al. | 395/200.17 |

(Continued)

FOREIGN PATENT DOCUMENTS

DE    29917651    12/2000

(Continued)

OTHER PUBLICATIONS

"Fieldbus brings protocol to process control", Santori et al., IEEE Spectrum, vol. 33, Issue 3, Mar. 1996, pp. 60-64.*

(Continued)

*Primary Examiner*—Anthony Knight
*Assistant Examiner*—Michael B. Holmes
(74) *Attorney, Agent, or Firm*—Westman, Champlin & Kelly, P.A.

(57) ABSTRACT

Improved script generation and usage for handheld field maintenance tools is provided. In one aspect, the handheld field maintenance tool actually generates scripts for later playback. Preferably script generation and/or playback or features are provided to field maintenance technicians. Additionally, scripts can be played on the handheld field maintenance tool without modification to the tool itself.

17 Claims, 4 Drawing Sheets

U.S. PATENT DOCUMENTS

| | | | |
|---|---|---|---|
| 5,665,899 A | 9/1997 | Willcox | 73/1.63 |
| 5,742,845 A | 4/1998 | Wagner | 395/831 |
| 5,752,249 A * | 5/1998 | Macon et al. | 707/103 R |
| 5,764,891 A | 6/1998 | Warrior | 395/200.2 |
| 5,793,963 A | 8/1998 | Tapperson et al. | 395/200.31 |
| 5,828,567 A | 10/1998 | Eryurek et al. | 364/184 |
| 5,838,187 A | 11/1998 | Embree | 327/512 |
| 5,909,368 A * | 6/1999 | Nixon et al. | 700/2 |
| 5,923,557 A | 7/1999 | Eidson | 364/471.03 |
| 5,940,290 A | 8/1999 | Dixon | 364/138 |
| 5,956,663 A | 9/1999 | Eryurek | 702/183 |
| 5,960,214 A * | 9/1999 | Sharpe et al. | 710/15 |
| 5,970,430 A | 10/1999 | Burns et al. | 702/122 |
| 5,980,078 A | 11/1999 | Krivoshein et al. | 364/131 |
| 5,995,916 A * | 11/1999 | Nixon et al. | 702/182 |
| 6,017,143 A | 1/2000 | Eryurek et al. | 364/148.06 |
| 6,023,399 A | 2/2000 | Kogure | 364/23 |
| 6,026,352 A | 2/2000 | Burns et al. | 702/182 |
| 6,047,222 A | 4/2000 | Burns et al. | 700/79 |
| 6,052,655 A | 4/2000 | Kobayashi et al. | 702/184 |
| 6,091,968 A | 7/2000 | Koohgoli et al. | 455/557 |
| 6,094,600 A | 7/2000 | Sharpe, Jr. et al. | 700/19 |
| 6,111,738 A | 8/2000 | McGoogan | 361/91.5 |
| 6,119,047 A | 9/2000 | Eryurek et al. | 700/28 |
| 6,179,964 B1 | 1/2001 | Begemann et al. | 162/198 |
| 6,192,281 B1 | 2/2001 | Brown et al. | 700/2 |
| 6,195,591 B1 * | 2/2001 | Nixon et al. | 700/83 |
| 6,211,623 B1 | 4/2001 | Wilhelm et al. | 315/224 |
| 6,236,334 B1 | 5/2001 | Tapperson et al. | 340/825.37 |
| 6,263,487 B1 | 7/2001 | Stripf et al. | 717/1 |
| 6,270,920 B1 | 8/2001 | Nakanishi et al. | 429/163 |
| 6,279,124 B1 | 8/2001 | Brouwer et al. | 714/38 |
| 6,298,377 B1 | 10/2001 | Hartkainen et al. | 709/223 |
| 6,304,934 B1 * | 10/2001 | Pimenta et al. | 710/305 |
| 6,307,483 B1 | 10/2001 | Westfield et al. | 340/870.11 |
| 6,317,701 B1 | 11/2001 | Pyotsia et al. | 702/188 |
| 6,324,607 B1 | 11/2001 | Korowitz et al. | 710/102 |
| 6,356,191 B1 | 3/2002 | Kirkpatrick et al. | 340/501 |
| 6,370,448 B1 | 4/2002 | Eryurek | 700/282 |
| 6,377,859 B1 | 4/2002 | Brown et al. | 700/79 |
| 6,397,114 B1 | 5/2002 | Eryurek et al. | 700/51 |
| 6,434,504 B1 | 8/2002 | Eryurek et al. | 702/130 |
| 6,444,350 B1 | 9/2002 | Toya et al. | 429/90 |
| 6,449,574 B1 | 9/2002 | Eryurek et al. | 702/99 |
| 6,473,710 B1 | 10/2002 | Eryurek | 702/133 |
| 6,487,462 B1 * | 11/2002 | Reeves | 700/73 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,594,603 B1 | 7/2003 | Eryurek et al. | 702/104 |
| 6,594,621 B1 * | 7/2003 | Meeker | 702/185 |
| 6,598,828 B1 * | 7/2003 | Fiebick et al. | 244/118.1 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,629,059 B1 | 9/2003 | Borgeson et al. | 702/183 |
| 6,654,697 B1 | 11/2003 | Eryurek et al. | 702/47 |
| 6,697,681 B1 * | 2/2004 | Stoddard et al. | 700/17 |
| 6,714,969 B1 | 3/2004 | Klein et al. | 709/219 |
| 6,775,271 B1 | 8/2004 | Johnson et al. | 370/352 |
| 2001/0053065 A1 | 12/2001 | Cudini et al. | 361/728 |
| 2002/0004370 A1 * | 1/2002 | Stengele et al. | 455/39 |
| 2002/0065631 A1 | 5/2002 | Loechner | |
| 2002/0077711 A1 | 6/2002 | Nixon et al. | |
| 2002/0123864 A1 | 9/2002 | Eryurek et al. | |
| 2003/0023408 A1 * | 1/2003 | Wight et al. | 702/187 |
| 2003/0023795 A1 | 1/2003 | Packwood et al. | |
| 2003/0033040 A1 | 2/2003 | Billings | 700/97 |
| 2003/0158795 A1 * | 8/2003 | Markham et al. | 705/28 |

FOREIGN PATENT DOCUMENTS

| | | |
|---|---|---|
| DE | 1993 0660 A1 | 1/2001 |
| DE | 100 32 774 A1 | 1/2002 |
| EP | 1022626 A2 | 7/2000 |
| GB | 2347232 | 8/2000 |
| JP | 2753592 | 1/1990 |
| WO | WO/96/12993 | 5/1996 |
| WO | WO/97/21157 | 6/1997 |
| WO | WO/98/14855 | 10/1997 |
| WO | WO/98/39718 | 9/1998 |
| WO | WO/00/41050 | 7/2000 |
| WO | WO 00/55700 | 9/2000 |
| WO | WO/02/027418 | 4/2002 |

OTHER PUBLICATIONS

"Computerized maintenece systems-an overview of two basic types for field devices", Medlin, IEEE Pulp and Pater Industry Technical Conference, Jun. 21-25, 1999, pp. 230-232.*

"Fieldbus in the process control laboratory-its time has come" Rehg et al., ASEE/IEEE Frontiers in Education Conference, vol. 3, Nov. 1999, pp. 13B4/12-13B4/17.*

"Generic device description for complex HART field devices", Zulkifli et al., IEE 8th International Conference on Communication Systems, vol. 2, Nov. 25-28, 2002, pp. 646-650.*

"SFC Smart Field Communicator-Model STS103", Honeywell, Specification, Dec. 1995, pp. 1-4.*

"SFC Smart Field Communicator-Models SFC160/SFC260", Yamatake, Specification, Apr. 1999, pp. 1-6.*

"HART Communicator", Fisher-Rosemount, Product Manual, Jul. 2000, pp. i-iv, ix-x, 1-1—1-40, 2-1—2-8, 3-1—3-38, A-1—A-6, B-1—B-6, C-1—C-4, D-1—D-4 and I-1—I-2.*

U.S. Appl. No. 09/384,876, filed Aug. 27, 1999, Eryurek et al.

U.S. Appl. No. 09/409,098, filed Sep. 30, 1999, Eryurek et al.

U.S. Appl. No. 09/799,824, filed Mar. 5, 2001, Rome et al.

U.S. Appl. No. 09/852,102, filed May 9, 2001, Eryurek et al.

U.S. Appl. No. 09/855,179, filed May 14, 2001 Eryurek et al.

U.S. Appl. No. 10/790,627, filed Mar. 6, 2003, Mathiowetz.

U.S. Appl. No. 10/438,386, filed Mar. 1, 2004, Mathiowetz et al.

U.S. Appl. No. 10/440,047, filed May 16, 2003, Kantzes et al.

U.S. Appl. No. 10/426,894, filed Apr. 30, 2003, Duren et al.

U.S. Appl. No. 10/438,401, filed May 16, 2003, Opheim et al.

U.S. Appl. No. 10/440,434, filed May 16, 2003, DelaCruz et al.

U.S. Appl. No. 10/435,819, filed May 12, 2003, Kantzes et al.

U.S. Appl. No. 10/440,048, filed May 16, 2003, Duren et al.

U.S. Appl. No. 10/440,444, filed May 16, 2003, Mathiowetz et al.

U.S. Appl. No. 10/439,660, filed May 16, 2003, Mathiowetz et al.

U.S. Appl. No. 10/439,764, filed May 16, 2003, Mathiowetz.

U.S. Appl. No. 10/310,703, filed Dec. 5, 2002, Zielinski et al.

U.S. Appl. No. 10/440,041, filed May 16, 2003, Mathiowetz et al.

U.S. Appl. No. 10/440,441, filed May 16, 2003, Mathiowetz et al.

"Fluke 179 Multimeter & ToolPak Combo Pack," http://www.fluke.com/MULTIMETER/TOOLPAK_.ASP?AGID=6&SID=260 (2 pages).

"Multifunction PDA Calibrator Transmation Model 3-PMF1," Transmation, Apr. 2001.

"AAPA 60 & 90 Series Multimeter," http://www.appatech.com/a-60new.htm (5 pages).

"Fieldbus Standard for Use in Industrial Control Systems Part 2: Physical Layer Specification and Service Definition", ISA-S50. Feb. 1992, pp. 1-93.

Hart Communications, Technical Information, Part 4 Communications, Samson, Frankfurt.

Shoji et al., Fieldbus System Engineering, 1999, Yokogawa Technical Report.

Diedrich et al., Field Device Integration in DCS Engineering Using a Device Model, 1998, IEEE.

Dewey, Fieldbus Device Maintenance—Do I Need To Go To the Field Anymore?, The Instrumentation, Systems and Automation Society, ISA 2000.

Simon et al., Field Devices—Models and Their Realizations, Dec. 11-14, 2002, Industrial Technology, IEEE ICIT 2002, IEEE International Conference, vol. 1, pp. 307-312.

"Hart Communicator," Asset Management Solutions, Fisher-Rosemount, Bulletin 62.1: Communicator, Jan. 2001, pp. 1-7.

Copy of European Search Report from European Application No.: 04252794.5, filed May 14, 2004.

* cited by examiner

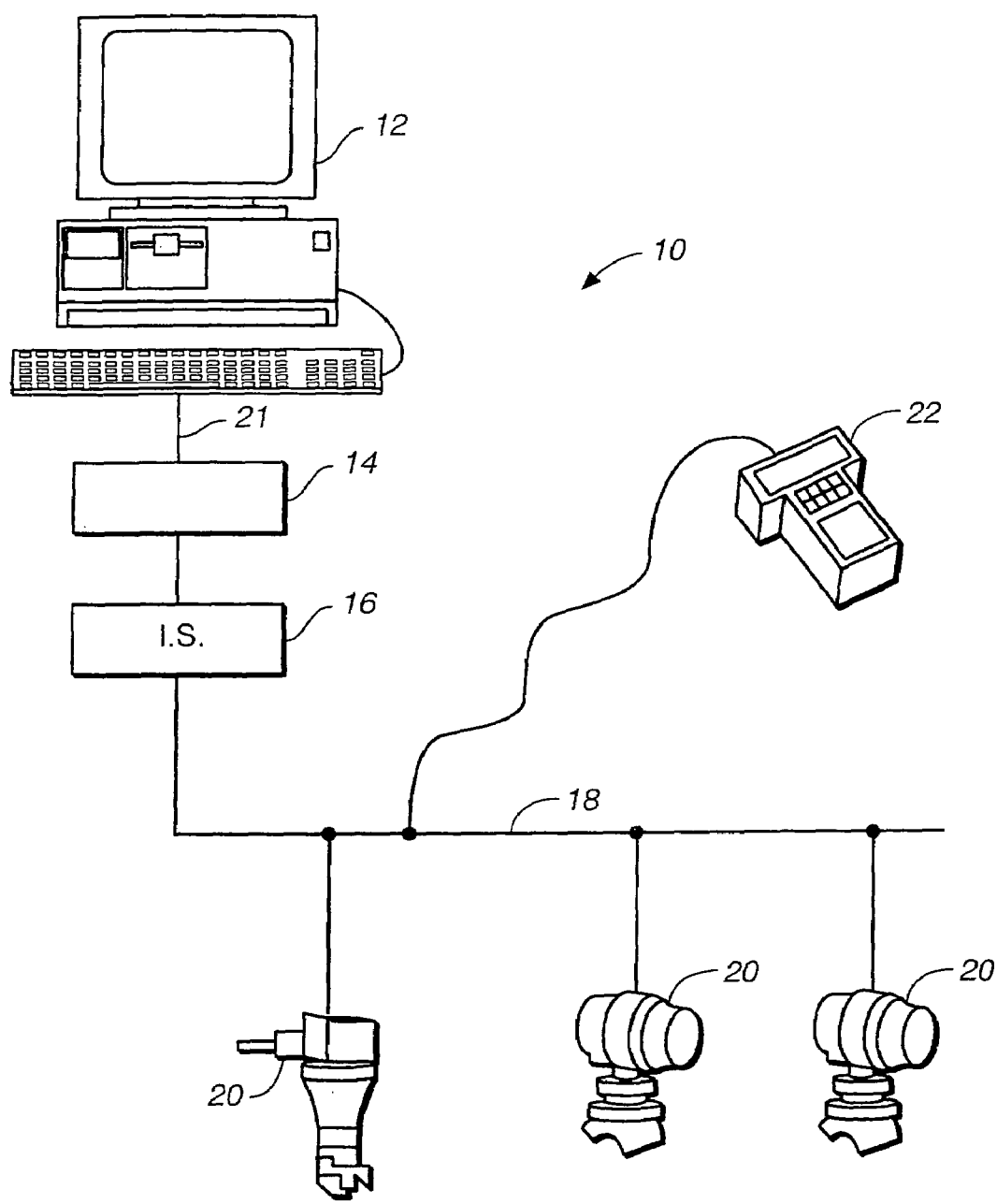
FIG._1

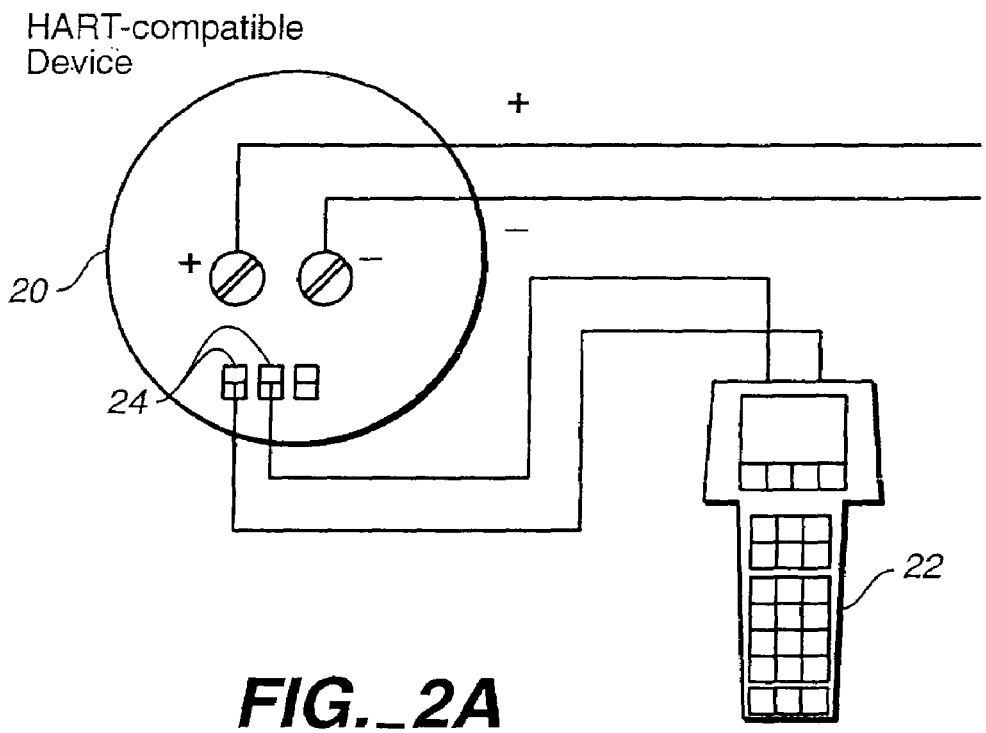
FIG._2A
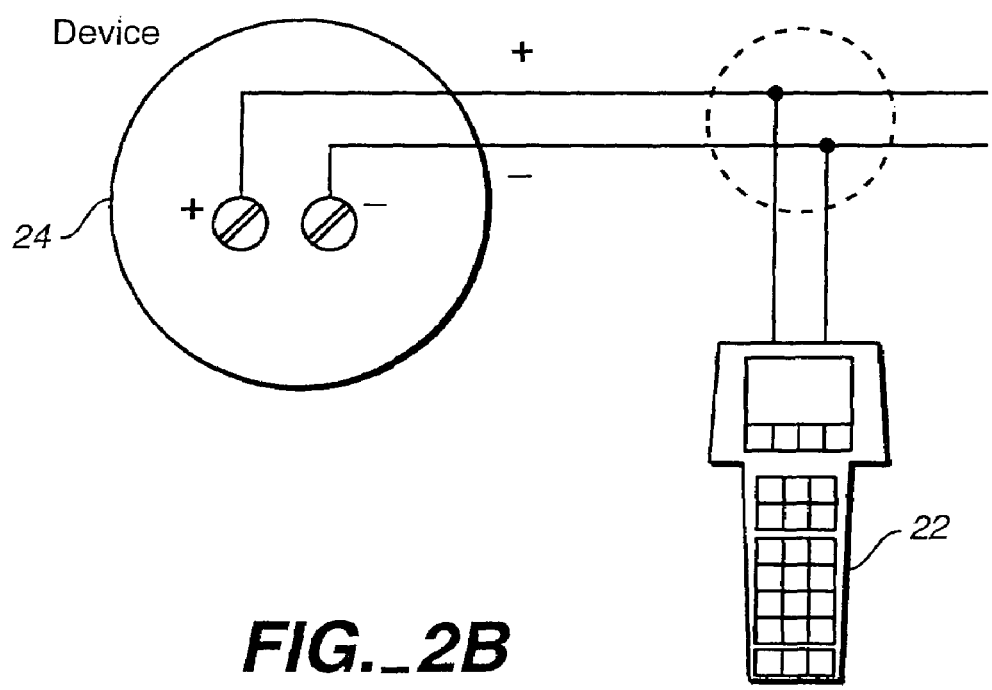
FIG._2B

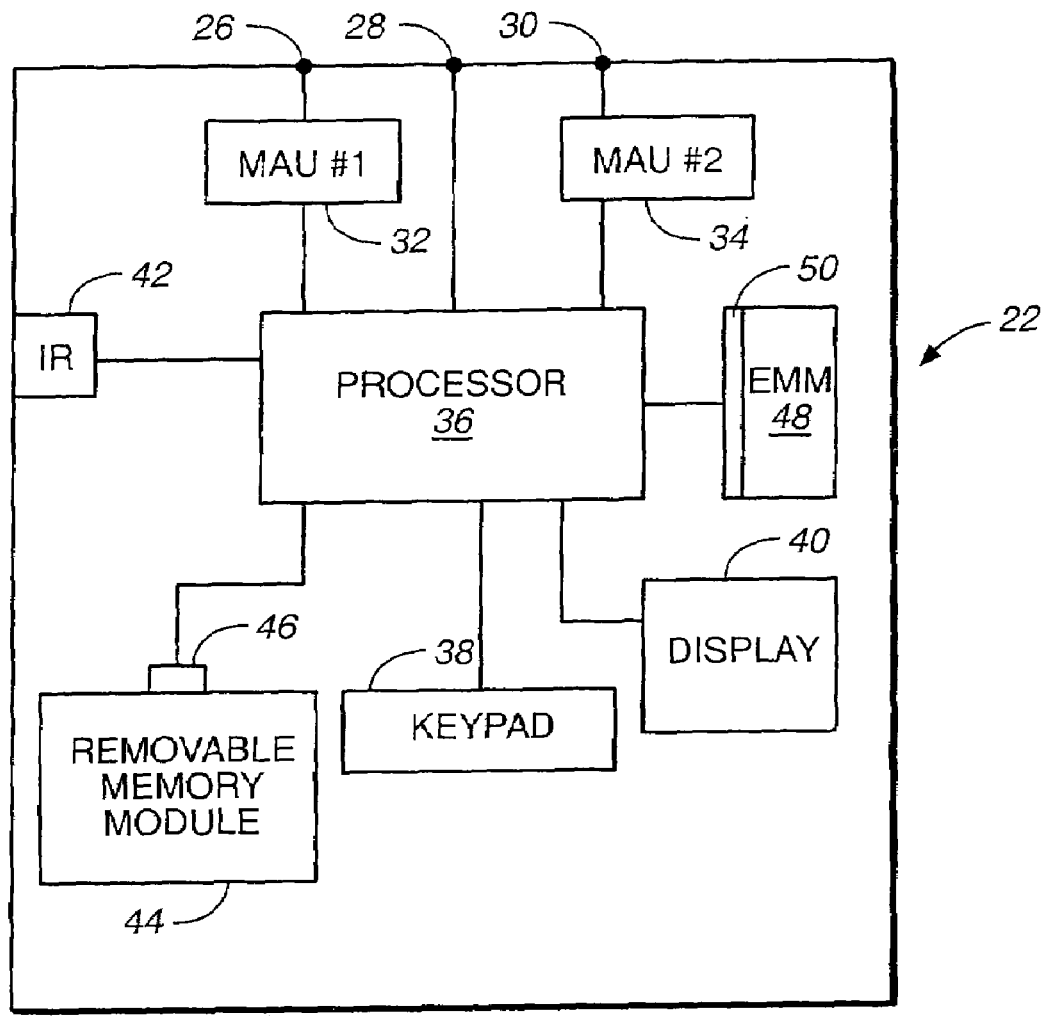
FIG._3

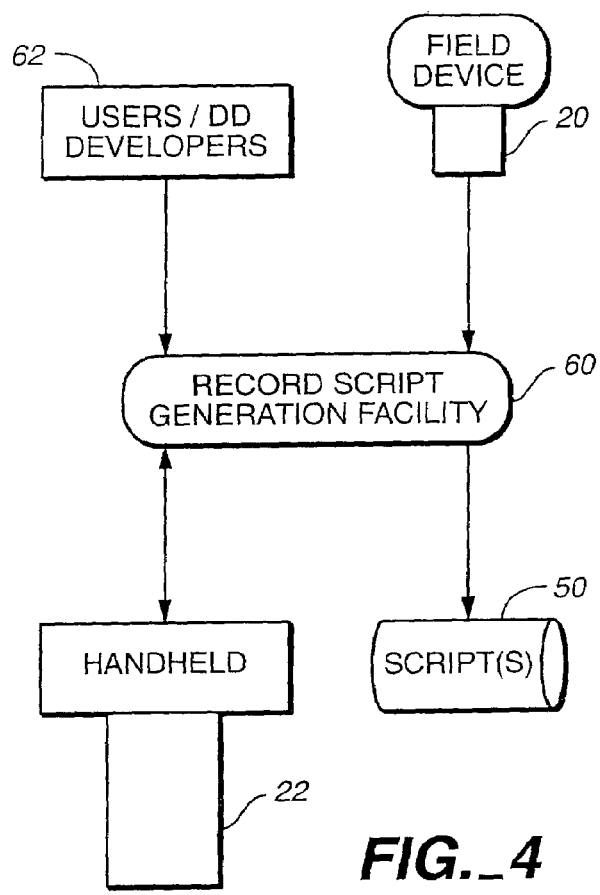
FIG._4
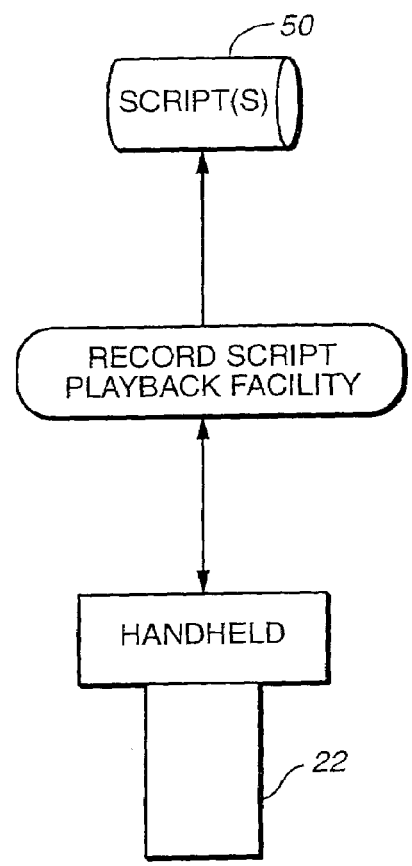
FIG._5

FIELD MAINTENANCE TOOL WITH ENHANCED SCRIPTS

BACKGROUND OF THE INVENTION

The present invention relates to industrial process control and measurement. More specifically, the present invention relates to a handheld field maintenance tool for use in industrial process control and measurement installations.

Field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation are detected, the use of an intrinsically safe handheld field maintenance tool allows technicians to quickly diagnose such errors in the field.

One such tool is sold under the trade designation Model 275 HART® Communicator available from Fisher-Rosemount Systems, Inc., of Eden Prairie, Minn. HART® is a registered trademark of the HART® Communication Foundation. The Model 275 provides a host of important functions and capabilities and generally allows highly effective field maintenance.

The Model 275 HART® Communicator can provide new functions and/or communication with new field devices by updating its software. When the software is updated, it is important to ensure that with each new update, that the new version of software will continue to function with all field devices with which the previous version was compatible. Testing the new software to ensure such compatibility is termed regression testing. One way in which this regression testing is performed, is by using scripts. Scripts allow behavior of the new software to be observed in response to artificial stimulus such as field device inputs and outputs and/or process communication inputs and outputs without the actual presence required of field devices or even a process communication loop. As used herein, "script" is intended to mean a data structure relative to one or more of tool inputs, tool outputs, process communication inputs, process communication outputs, or any combination thereof. It is known to use such scripts to verify new releases of the software that runs on the Model 275.

Scripts are currently generated on a simulator and played back via a customized tool (using custom hardware such as a tool interface coupled to a general purpose computer via a specialized peripheral card resident within the computer) to verify the software. This approach to regression testing has proved effective in the past. However, as handheld field maintenance tools evolve, more effective use of scripts can provide not only more effective software testing, but a valuable asset for a field maintenance technician.

SUMMARY OF THE INVENTION

Improved script generation and usage for handheld field maintenance tools is provided. In one aspect, the handheld field maintenance tool actually generates scripts for later playback. Preferably script generation and/or playback or features are provided to field maintenance technicians. Additionally, scripts can be played on the handheld field maintenance tool without modification to the tool itself.

BRIEF DESCRIPTION OF THE DRAWINGS

FIG. 1 illustrates a multidrop wiring configuration.

FIGS. 2A and 2B illustrate ways in which an intrinsically safe field maintenance tool may be connected to a process device.

FIG. 3 is a diagrammatic view of field maintenance tool in accordance with an embodiment of the present invention.

FIG. 4 is a diagrammatic view of script generation in accordance with embodiments of the present invention.

FIG. 5 is a diagrammatic view of script playback in accordance with embodiments of the present invention.

DETAILED DESCRIPTION OF THE PREFERRED EMBODIMENTS

The Model 275 HART® communicator currently uses scripts to some extent. These scripts are generally data structures or files related to one or more of tool inputs, tool outputs, process communication inputs, process communication outputs, and/or any combination thereof.

One example of an improved handheld field maintenance tool with which embodiments of the invention are particularly useful is a new tool that is operable with at least two industry standard device descriptions. In one specific embodiment, an improved handheld field maintenance tool implements both HART® and fieldbus Device Description Language (DDL). The improved handheld field maintenance tool is used to maintain both two-wire and four-wire (i.e. external power) field devices using these protocols. Preferably, both configuration and calibration are supported via DDL technology. DDL technology is known and additional reading regarding Device Description Language can be found in U.S. Pat. No. 5,960,214 to Sharp, Jr. et al. While embodiments of the invention would be described with respect to the improved intrinsically safe field maintenance tool, those skilled in the art will recognize that some embodiments of the present invention can in fact be practicable with the Model 275 HART® Communicator as well as other known commercially available communicators.

The improved handheld field maintenance tool facilitates a convenient display of diagnostic information from individual field devices (i.e. status bits) as well as providing advanced protocol-specific network troubleshooting features. Further details and benefits of aspects of the present invention in combination the improved handheld field maintenance tool will be appreciated after reading the description below.

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ Fieldbus process communication loop and is coupled to field devices 20, which are shown arranged in a multi-drop configuration. An alternative process communication loop (not shown) is an HART® process communication loop. FIG. 1 illustrates a multi-drop wiring configuration that vastly simplifies system wiring compared to other topologies such as the star topology. Multi-drop HART® configurations support a maximum of 15 devices, while multi-drop FOUNDATION™ Fieldbus configurations support a maximum of 32 devices.

Handheld field maintenance tool 22 is coupled to loop 18 as illustrated in FIG. 1. When coupled to a process control loop as shown, tool 22 can perform a number of the communication and diagnostic functions. Tool 22 can couple to and interact with HART® process communication loops in much the same way the presently available Model 275 HART® Communicator can.

FIG. 2A illustrates tool 22 coupled to HART®-compatible device 20 via terminals 24. Alternately, tool 22 can communicate with a HART® compatible device on the process instrumentation communication loop, such as device 24 via the loop itself, as indicated in FIG. 2B.

FIG. 3 is a diagrammatic view of handheld field maintenance tool 22 with which embodiments of the present invention are particularly useful. As illustrated, tool 22 preferably includes three communication terminals 26, 28 and 30 which facilitate coupling tool 22 to process communication loops and/or devices in accordance with at least two process industry standard protocols. For example, when tool 22 is to be coupled to a loop of a first process industry standard protocol, such coupling is effected using terminal 26 and common terminal 28. Accordingly, the connection then is made via media access unit 32 which is configured to interact upon the process communication loop in accordance with the first industry standard protocol. Additionally, when tool 22 is to be coupled to a process and control measurement loop that operates in accordance with a second industry standard protocol, such connection is made via common terminal 28 and terminal 30. Thus, such a connection is effected via the second media access unit 34 which is configured to interact upon the process communication loop in accordance with the second industry standard protocol. Both media access units 32 and 34 are coupled to processor 36 which receives data from one of the media access units and interprets that data accordingly.

Processor 36 is also coupled to keypad module 38 and display module 40. Keypad module 38 is coupled to the keypad on the housing of tool 22 in order to receive various keypad inputs from a user. Display module 40 is coupled to the display to provide data and/or a user interface.

Tool 22 can also include additional hardware enhancements that facilitate increased functionality. In one embodiment, tool 22 includes infrared data access port 42 which is coupled to processor 36 to allow tool 22 to transfer information to and from a separate device using infrared wireless communication. One advantageous use of port 42 is for transferring and/or updating scripts and/or Device Descriptions stored in one or more memories of tool 22. A Device Description (DD) is a software technology used to describe parameters in a field device in a computer-readable format. This DD contains all of the information necessary for a software application being executed on processor 36 to retrieve and use the parametric data. The separate device such as computer 12, can obtain a new scripts, Device Description, or any other suitable information from floppy disk, CD-ROM, or the internet and wirelessly transfer the new information to tool 22.

Removable memory module 44 is removably coupled to processor 36 via port/interface 46. Removable memory module 44 is adapted to store software applications that can be executed instead of primary applications on processor 36. For example, module 44 may contain applications that use the HART® or FOUNDATION™ fieldbus communication port, to provide a comprehensive diagnostic for a given process valve. Additionally, module 44 may store software applications that aid in the calibration or configuration of specific devices. Module 44 may also store a software image for a new or updated primary tool application that can subsequently be transferred into the non-volatile memory of processor 36 to enable execution of the updated application. Further still, module 44 provides removable memory storage for the configuration of multiple devices allowing a field maintenance technician to acquire a relatively substantial amount of device data, including scripts, and conveniently store or transfer such data by simply removing module 44.

Preferably, module 44 is adapted to be replaceable in hazardous areas in a process plant. Thus, it is preferred that module 44 comply with intrinsic safety requirements set forth in: APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610, promulgated by Factory Mutual Research October, 1988. Adaptations to comply with additional industrial standards such as Canadian Standards Association (CSA) and the European CENELEC standards are also contemplated. Examples of specific structural adaptations for memory module 44 and/or interface 46 to facilitate compliance include energy limiting circuits such that the operating voltage level of memory module 44 is sufficiently low that stored energy within module 44 cannot generate a source of ignition. Additionally, module 44 may include current limiting circuitry to ensure that in the event that specific terminals on module 44 are shorted, that the discharge energy is sufficiently low that ignition is inhibited. Finally, interface 44 may include physical characteristics that are specifically designed to prevent exposure of electrical contacts on memory module 44 to an external environment while simultaneously allowing suitable interface contacts to make electrical contact with module 44. For example, module 44 may include an over-molding that can be pierced or otherwise displaced by coupling module 44 to interface 46.

Tool 22 also preferably includes expansion memory module 48 coupled to processor 36 via connector 50 which is preferably disposed on the main board of tool 22. Expansion memory module 48 may contain Device Descriptions and/or scripts relative to field devices of either of first and second industry standard protocols. Module 48 may also contain license code(s) that will determine the functionality of tool 22 with respect to the multiple protocols. For example, data residing within module 48 may indicate that tool 22 is only authorized to operate within a single process industry standard mode, such as the HART® protocol. Ultimately, a different setting of that data within module 48 may indicate that tool 22 is authorized to operate in accordance with two or more industry standard protocols. Module 48 is preferably inserted to a connector 50 on the main board and may in fact require partial disassembly of tool 22, such as removing the battery pack to access port 50.

Embodiments of the present invention provide significantly enhanced generation and utilization of scripts with a handheld field maintenance tool. Using embodiments of the present invention, each new release of software for the field maintenance tool can be verified in much the same manner as the regression test system that was used with the Model 275. However, significantly improved functions are provided in accordance with embodiments of the present invention. One specific improvement is the ability to play scripts on a standard, non-specialized, handheld field maintenance tool. Further, unlike prior handheld tools, the handheld field maintenance tool described herein is able to generate scripts. Such script generation provides a number of advantages for field maintenance technicians since problems in the field can be captured and effectively studied by field support personnel and/or software engineering personnel. Yet another improved function, in accordance with embodiments of the present invention is the generation and/or playback of FOUNDATION™ Fieldbus scripts.

In the past, when a technician would encounter a problem in the field, the exact sequence of operations to repeat the problem would likely been forgotten by the time the technician contacted field support and/or software engineering. Therefore, the problem sometimes would not be reproducible by the technician, field support personnel, or software engineering personnel. Allowing a field maintenance technician to generate scripts with the handheld field maintenance tool allows the problems to be studied in precise detail and will generally increase problem reproducibility.

FIG. 4 is a diagrammatic view of record script generation in accordance with embodiments of the present invention. Scripts 50 are essentially repositories for regression test stimulus. Scripts 50 capture all the input/output functionality relative to handheld tool 22 (e.g. keyboard inputs, touch screen inputs, display screen outputs, HART® and/or FOUNDATION™ Fieldbus communication inputs and outputs). With respect to the HART® and/or FOUNDATION™ fieldbus communication inputs, this allows the regression test system of handheld device 22 to not require the presence of field devices, such as device 20 during testing. This feature is important because having and maintaining numerous physical field devices, many of which are manufactured by various companies, is an extremely difficult, if not impossible task. Moreover, getting such field devices 20 into or back to exactly the same state (i.e. previous configurable parameters and previous calibrations) as when the script was first generated is also difficult and potentially impossible for some field devices. Scripts, as used herein, are not limited to capturing handheld/field device behavior, but can also be used to capture behavior that does not involve process communications whatsoever.

FIG. 4 illustrates record scripts generation facility 60 which is preferably a software component that can be embodied within handheld tool 22. However, facility 60 can be embodied with any suitable computing environment. Facility 60 enables device description information (i.e., files generated from the DDL specification that document field device communication interaction) developers and the user of handheld tool 22 to create scripts 50. Scripts can include a file or data structure that records a sequence of frames of technician action, the resultant display screen on tool 22, as well as a set of request/reply HART® or FOUNDATION™ Fieldbus communication. Scripts can be generated by intercepting all input output activity on handheld tool 22 to allow facility 60 to capture technician inputs, field device communication requests and associated replies, as well as information presented on the display of tool 22. For each and every occurrence of technician input, a frame, or data structure within the script, is created. Each frame preferably consists of all process communication request/reply pairs that occurred since the last recorded frame; the current application display screen on tool 22; and technician input. The script is then transferred to a playback application where it can be played to simulate the recorded behavior without field device 20.

Field device manufacturers are the primary source of scripts used for regression testing. Scripts are generally created when field device developers are satisfied with the operational behavioral of handheld device 22 and their specific Device Description. A Device Description is essentially a device driver which instructs the software application on handheld tool 22 to communicate and interact with the specific field device. Scripts can also be generated by software engineering personnel for handheld tool 22.

As described briefly above, a powerful new use for scripts, in accordance with embodiments of the present invention, is allowing technicians to generate their own scripts using handheld tool 22. This feature precisely captures problems discovered in the field. Once such a problem is been captured, it can be reported to field support and/or software engineering personnel. Preferably, software within tool 22 records scripts each time tool 22 is energized. Thus, handheld tool 22 maintains a log of all interaction thereon and when a technician discovers that a problem has been encountered, the already logged interaction can be bracketed and flagged as a problem. In this manner, a technician need not be expecting to encounter a specific problem in order to accurately capture the problem, but may simply flag a series of frames within handheld tool 22 as indicative of the problem.

FIG. 5 is a diagrammatic view of script playback in accordance with the embodiments of the present invention. In the playback mode, scripts will play both the roles of the technician and the field device(s) (i.e., stimulate the handheld application(s) in precisely the same manner as when the script was generated). HART® and FOUNDATION™ Fieldbus communication requests from handheld applications are matched in the script and the corresponding communication replies are injected stimulus to the handheld application. Display screens recorded during script generation can be compared against those currently on the display screen of tool 22. Keypresses recorded in the script will be injected into the handheld software application in the exact order as they were recorded during script generation. The playback facility preferably logs all display screens that are observed in a different file. These differences can subsequently be interpreted, preferably by an application, that need not necessarily be resident on tool 22.

Playback mode is preferably also offered to field maintenance technicians. Scripts can be played on the handheld tool without requiring the technician to couple the tool to an external device. In this regard, the tool can be considered a stand-alone script playback device. Further, allowing technicians to record and playback scripts will facilitate field maintenance. For example, the technician may be able to see if a problem is reproducible or not. Reproducibility is sometimes key information in the analysis of the problem (for example if a problem cannot be recreated using precisely the same software stimulus, the problem may exist in another product in communication with handheld tool 22, or may be due to some other dynamic (multitasking event)).

Although the present invention has been described with reference to preferred embodiments, workers skilled in the art will recognize that changes may be made in form and detail without departing from the spirit and scope of the invention.

What is claimed is:

1. A computer-implemented method of generating a script for a handheld field maintenance tool, the method comprising:
 observing at least one of input and output activity on the tool; and
 recording at least one frame on the tool relative to the observed activity.

2. The method of claim 1, wherein the at least one of input and output activity includes a tool input.

3. The method of claim 1, wherein the at least one of input and output activity includes a tool output.

4. The method of claim 1, wherein the at least one of input and output activity includes a process communication input.

5. The method of claim 4, wherein the process communication input is in accordance with HART® protocol.

6. The method of claim 4, wherein the process communication input is in accordance with the FOUNDATION™ Fieldbus protocol.

7. The method of claim 1, wherein the at least one of input and output activity includes a process communication output.

8. The method of claim 7, wherein the process communication output is in accordance with HART® protocol.

9. The method of claim 7, wherein the tool is adapted for use with a process control system and wherein the process communication output is in accordance with the FOUNDATION™ Fieldbus protocol.

10. The method of claim 1 wherein the frame is indicative of a problem in the process control system.

11. The method of claim 1, and further comprising automatically recording frames beginning when the tool is energized.

12. The method of claim 11, wherein substantially all input and output activity on the tool is recorded in the frames.

13. The method of claim 12, and further comprising receiving an indication that a sequence of frames is indicative of a problem, and storing the indication.

14. The method of claim 1, wherein the at least one of input and output activity is related to information from a field device in a process control system.

15. A computer-implemented method of playing back a script, the method comprising:
 conveying the script to memory within a handheld field maintenance tool;
 causing the tool to enter a script playback mode;
 playing the script on the tool as a stand-alone playback device.

16. A handheld field maintenance tool comprising:
 a display;
 memory to store at least one script; and
 a processor coupled to the display and the memory and adapted to execute the script in a stand-alone playback mode to display script execution.

17. The tool of claim 16, further comprising:
 first and second media access units coupled to the processor, wherein the first media access unit is adapted to couple to a process communication loop in accordance with a first process communication protocol, and wherein the second media access unit is adapted to coupled to a process communication loop in accordance with a second process communication protocol different from the first process communication protocol.

* * * * *